US012807153B2

(12) United States Patent
Park

(10) Patent No.: US 12,807,153 B2
(45) Date of Patent: Nov. 24, 2026

(54) CONTROL METHOD AND SYSTEM FOR SMART CRUISE CONTROL ACCORDING TO DRIVER'S CARELESSNESS

(71) Applicant: HL Klemove Corp., Incheon (KR)

(72) Inventor: Hyunsoo Park, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 182 days.

(21) Appl. No.: 18/369,457

(22) Filed: Sep. 18, 2023

(65) Prior Publication Data

US 2024/0157939 A1 May 16, 2024

(30) Foreign Application Priority Data

Nov. 15, 2022 (KR) ........................ 10-2022-0152364

(51) Int. Cl.
*B60W 30/16* (2020.01)
*B60W 30/182* (2020.01)
(Continued)

(52) U.S. Cl.
CPC .......... *B60W 30/16* (2013.01); *B60W 30/182* (2013.01); *B60W 40/08* (2013.01);
(Continued)

(58) Field of Classification Search
CPC .... B60W 30/16; B60W 30/182; B60W 40/08; B60W 50/14; B60W 2040/0818;
(Continued)

(56) References Cited

U.S. PATENT DOCUMENTS

2005/0128092 A1* 6/2005 Bukman ............... B60W 40/08 340/576
2010/0030434 A1* 2/2010 Okabe .................... B60K 28/06 719/327
(Continued)

FOREIGN PATENT DOCUMENTS

JP 2000233663 A * 8/2000
JP 2017-511766 A 4/2017
(Continued)

OTHER PUBLICATIONS

Office Action issued on Mar. 11, 2025 for corresponding Korean Patent Application No. 10-2022-0152364 along with an English translation (11 pages).

*Primary Examiner* — Aniss Chad
*Assistant Examiner* — Nikki Marie M Molina
(74) *Attorney, Agent, or Firm* — Hauptman Ham, LLP

(57) ABSTRACT

The present disclosure relates to a control system for cruise control and a control method performed by the control system for cruise control to determine whether a driver is exhibiting carelessness based on a driver's steering wheel contact time, and to control a distance between a driving vehicle and another vehicle. The control method for cruise control includes determining a driving mode of a driving vehicle, determining a headway level according to a period of time during which a driver's head is out of a predetermined position when the driving vehicle is in a smart cruise control mode, determining whether a driver of the driving vehicle is careless, and controlling the driving vehicle to adjust a distance between the driving vehicle and another vehicle based on the determined headway level and whether the driver of the driving vehicle is careless.

14 Claims, 7 Drawing Sheets

(51) Int. Cl.
*B60W 40/08* (2012.01)
*B60W 50/14* (2020.01)

(52) U.S. Cl.
CPC ..... *B60W 50/14* (2013.01); *B60W 2040/0818* (2013.01); *B60W 2050/143* (2013.01); *B60W 2540/223* (2020.02); *B60W 2540/229* (2020.02); *B60W 2554/802* (2020.02)

(58) Field of Classification Search
CPC ..... B60W 2050/143; B60W 2540/223; B60W 2540/229; B60W 2554/802; B60W 2754/30; B60Y 2300/16; B60Y 2302/03
See application file for complete search history.

(56) References Cited

U.S. PATENT DOCUMENTS

| | | | | |
|---|---|---|---|---|
| 2010/0039249 | A1* | 2/2010 | Schmitz | G08B 21/06 340/576 |
| 2016/0357185 | A1* | 12/2016 | Laur | G05D 1/0212 |
| 2018/0072310 | A1* | 3/2018 | Fung | B60W 30/02 |
| 2021/0122366 | A1* | 4/2021 | Lee | B60W 30/09 |
| 2022/0063635 | A1* | 3/2022 | Kim | B60W 40/09 |

FOREIGN PATENT DOCUMENTS

| | | | |
|---|---|---|---|
| KR | 10-2019-0104474 | A | 9/2019 |
| KR | 10-2022-0029842 | A | 3/2022 |

* cited by examiner

CONTROL METHOD AND SYSTEM FOR SMART CRUISE CONTROL ACCORDING TO DRIVER'S CARELESSNESS

CROSS-REFERENCE TO RELATED APPLICATION

This application claims priority from and the benefit of Korean Patent Application No. 10-2022-0152364, filed on Nov. 15, 2022, which is hereby incorporated by reference for all purposes as if set forth herein.

TECHNICAL FIELD

The present disclosure relates to a control method and system for smart cruise control according to a driver's carelessness, and more specifically, to a control method and system which determines whether a driver is exhibiting carelessness based on a driver's steering wheel contact time, and controls a distance between a driving vehicle and front and rear vehicles thereof.

BACKGROUND

Cruise control is a function that allows a vehicle to drive at a specified speed without stepping on an accelerator pedal when activated after accelerating the vehicle to a certain speed. The cruise control function is almost essential in continents such as North America, Asia, or Europe where people move frequently between countries. Cruise control has been applied to all types of cars from large cars to compact cars.

The cruise control function is advantageous because a driver does not have to continuously steer, but a disadvantage of cruise control is that a driver's tension is relieved and the risk of collision increases. Recently, autonomous vehicles have been developed and improved by adding functions such as lane keeping, automatic lane change, and cruise control.

However, despite the advantages and technology development of the cruise control function, a driver's carelessness that sometimes occurs when using cruise control to drive the vehicle can lead to a serious accident. Accordingly, it is necessary to develop a technology capable of preliminarily determining a driver's careless state and supplementing the cruise control function based thereon.

The above-described background art is technical information that the present inventors possessed for derivation of the present disclosure or acquired during the derivation process of the present disclosure, and cannot necessarily be said to be known to the general public prior to filing the present disclosure.

SUMMARY

In view of the above, the present disclosure provides a control method for cruise control capable of supplementing a cruise control function by determining whether a driver is careless based on a headway level.

In addition, the present disclosure provides a method for preventing the risk of collision between a driving vehicle by controlling the distance between the driving vehicle and a front vehicle depending on driver's carelessness.

Further, the present disclosure provides a method capable of preventing the risk of collision between a driving vehicle by controlling the distances between the driving vehicle and front and rear vehicles of the driving vehicle.

A method performed by a control system for cruise control may include determining a driving mode of a driving vehicle, determining a headway level when the driving vehicle is in a smart cruise control mode, determining whether a driver of the driving vehicle is careless, and adjusting a distance between the driving vehicle and another vehicle.

In one embodiment, the determination of whether the driver of the driving vehicle is careless includes calculating a steering wheel contact time of the driving vehicle.

In one embodiment, the determination of whether the driver of the driving vehicle is careless further includes sending a warning alarm based on the steering wheel contact time.

In one embodiment, the adjustment of the distance between the driving vehicle and another vehicle includes adjusting the distance of the driving vehicle and another vehicle based on the steering wheel contact time.

In one embodiment, the adjustment of the distance between the driving vehicle and another vehicle further includes calculating a first distance between the driving vehicle and a first vehicle on a front side of the driving vehicle in a driving direction.

In one embodiment, the adjustment of the distance between the driving vehicle and another vehicle further includes calculating a second distance between the driving vehicle and a second vehicle on a rear side of the driving vehicle in the driving direction.

In one embodiment, the adjustment of the distance between the driving vehicle and another vehicle further includes adjusting the distance between the driving vehicle and another vehicle based on the first distance and the second distance.

An embodiment of the present disclosure provides a method of determining the driver's carelessness based on the driver's headway level.

In addition, according to the present disclosure, the safety of the driving vehicle can be improved by supplementing the cruise control function by adjusting the distance between the driving vehicle and another vehicle according to the level of the driver's carelessness.

Further, according to the present disclosure, it is possible to prevent a vehicle collision risk that may occur on the rear side as well as the front side of the driving vehicle by adjusting the distance between the driving vehicle and the rear and front vehicles.

DETAILED DESCRIPTION

Figure 1:
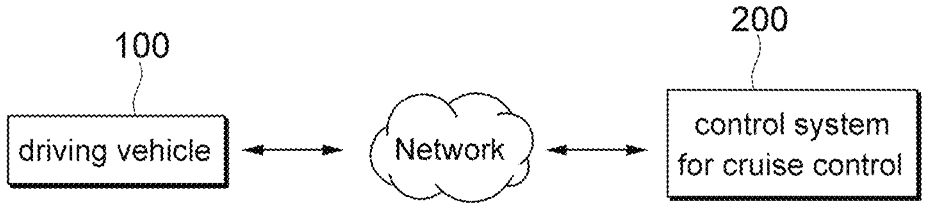
FIG. 1 illustrates an exemplary environment for a control system for cruise control to be applied according to embodiments of the present disclosure.

Hereinafter, embodiments of the present disclosure will be described in detail with reference to the accompanying drawings. Advantages and features of the present disclosure, and methods of achieving them, will become clear with reference to the embodiments that are described in detail below in conjunction with the accompanying drawings. However, the technical idea of the present disclosure is not limited to the embodiments described below, but may be implemented in various forms different from each other, and the present embodiments are merely provided to make the technical idea of the present disclosure complete, and to completely inform those skilled in the art to which the present disclosure pertains of the scope of the present disclosure. The present disclosure is only defined by the scope of the claims.

It should be noted that in assigning reference numerals to the components of each drawing, the same components have the same numerals as much as possible even when they are shown in different drawings. In addition, in describing the present disclosure, when it is determined that a detailed description of a related known configuration or function may obscure the gist of the present disclosure, the detailed description will be omitted.

Unless otherwise defined, all terms (including technical and scientific terms) used in the present specification may be used in a meaning that is commonly understood by those skilled in the art to which the present disclosure pertains. In addition, terms defined in commonly used dictionaries are not interpreted ideally or excessively unless specifically defined explicitly. The terms used herein are for describing the embodiments and are not intended to limit the present disclosure. In the present specification, the singular also includes the plural unless specifically stated in the phrase.

In addition, terms such as first, second, A, B, (a), and (b) may be used in describing the components of the present disclosure. These terms are only used to distinguish one component from another, and the nature, sequence, or order of the corresponding component is not limited by the term. When a component is described as being "linked," "coupled," or "connected" to another component, the corresponding component may be directly linked or connected to another component, but it should be understood that another component may be "linked", "coupled" or "connected" between the components.

In the present specification, expressions such as "comprise(s) (comprising)" and/or "include(s) (including)" indicate the existence of the mentioned component, step, operation and/or element, and do not preclude the presence or addition of one or more other components, steps, operations and/or elements. Hereinafter, various embodiments of the present disclosure will be described in detail with reference to the accompanying drawings.

Throughout the present specification, when a part 'comprises' or 'includes' a certain component, it means that the part may further include other components without excluding other components unless otherwise stated. Furthermore, terms such as 'unit' and 'module' described in the present specification refer to a unit that processes at least one function or operation, and may be implemented by hardware or software, or a combination of hardware and software.

FIG. 1 illustrates an exemplary environment to which a control system for cruise control according to embodiments of the present disclosure may be applied. When a vehicle 100 drives in a cruise control mode, a system including the driving vehicle 100 and a control system for cruise control 200, shown in FIG. 1, may control the cruise control to prevent collision of the driving vehicle 100.

Hereinafter, operations of components shown in FIG. 1 in relation to the control of cruise control of the driving vehicle 100 through the above-described system will be described in more detail.

FIG. 1 shows an exemplary embodiment in which the driving vehicle 100 and the control system for cruise control 200 are connected through a network. In some embodiments, the number of devices that can be connected to the network may vary.

FIG. 1 illustrates an exemplary embodiment for achieving the objective of the present disclosure, and some components may be added or deleted as necessary. Hereinafter, the components shown in FIG. 1 will be described in more detail.

The control system for cruise control 200 may determine a mode of the driving vehicle 100, determine whether a driver steering the driving vehicle 100 is careless when the driving vehicle is in an autonomous driving mode, and control the driving vehicle 100 based on if the driver is exhibiting carelessness or not. In this case, the control system for cruise control 200 may collect and analyze various information generated in the driving vehicle 100.

Various information may include all data generated in the driving vehicle 100, for example, a speed of the driving vehicle, a wheel angle of a steering device, the specifications of the driving vehicle itself, and may further include information about the environment in which the driving vehicle 100 is located. Such information may be information collected by using a series of devices in the driving vehicle 100 while the driving vehicle 100 is driving. The series of devices may include all electronic devices. In addition, such information may include information collected when the vehicle is stationary rather than driving.

The driving vehicle 100 shown in FIG. 1 may include a vehicle equipped with autonomous driving technology or a vehicle not equipped with a general autonomous driving technology. The driving vehicle 100 may include both a four-wheeled vehicle and a two-wheeled motorcycle.

In order to avoid redundant descriptions, various operations performed by the control system for cruise control 200 will be described in more detail later with reference to FIG. 2 and the subsequent drawings.

Meanwhile, the control system for cruise control 200 may be implemented with one or more computing devices. For example, all functions of the control system for cruise control 200 may be implemented in a single computing device. As another example, a first function of the control system for cruise control 200 may be implemented in a first computing device, and a second function may be implemented in a second computing device. In this case, the computing device may be a notebook, a desktop, or a laptop, but is not limited thereto and may include any type of device equipped with a computing function. The control system for cruise control 200 be implemented as a high-performance server-class computing device. An example of the computing device will be described with reference to FIG. 7.

In addition, functions that can be implemented in the control system for cruise control 200 may also be implemented using electronic devices mounted in the driving vehicle 100. Accordingly, although the control system for cruise control 200 and the driving vehicle 100 are shown separately in FIG. 1, according to one embodiment, the control system for cruise control 200 may be mounted on the driving vehicle 100 and the control system for cruise control 200 may implement the first function and the second function in the driving vehicle 100. Accordingly, it should be noted that the present disclosure is not limited to the embodiment in which the driving vehicle 100 and the control system for cruise control 200 are externally separated as shown in FIG. 1.

In the present specification, for convenience of description, a situation in which the driving vehicle 100 and the control system for cruise control 200 are separated to implement functions will be described.

In some embodiments, components included in an environment to which the control system for cruise control 200 is applied may communicate through a network. The network may be implemented as all types of wired/wireless networks such as a local area network (LAN), a wide area network (WAN), a mobile radio communication network, and Wibro (Wireless Broadband Internet).

Meanwhile, the environment shown in FIG. 1 shows that the driving vehicle 100 and the control system for cruise control 200 are connected through a network, but the scope of the present disclosure is not limited thereto, and it should be noted that the driving vehicle 100 and the control system for cruise control 200 may also be connected through P2P (Peer to Peer).

So far, with reference to FIG. 1, an exemplary environment to which the control system for cruise control 200 according to embodiments of the present disclosure may be applied has been described. Hereinafter, methods according to various embodiments of the present disclosure will be described in detail with reference to FIG. 2 and the subsequent drawings.

Each step of the methods described below may be performed by the computing device. In other words, each step of the methods may be implemented as one or more instructions executed by a processor of the computing device. All of the steps involved in these methods could be performed by one physical computing device, but first steps of the methods may be performed by a first computing device and second steps of the methods may be performed by a second computing device. The instructions may be used as the same language as a process and may determine a method or step performed in the computing device.

Figure 2:
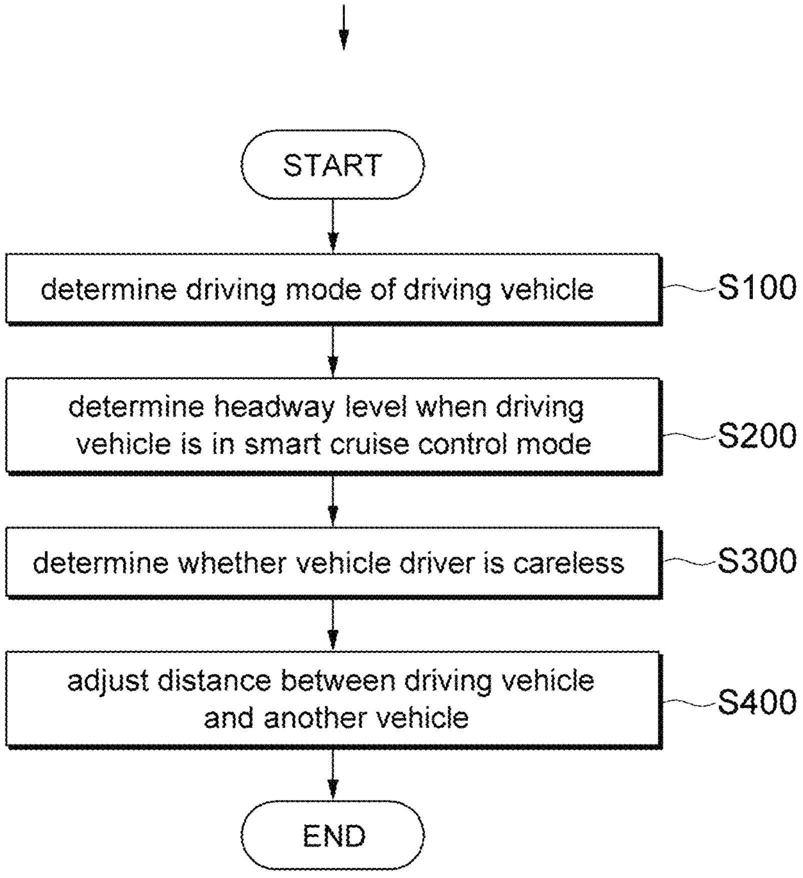
FIG. 2 is a flowchart illustrating a control method for a cruise control function according to driver carelessness, which may be performed by the control system for cruise control according to embodiments of the present disclosure.

In FIG. 2, the description will be continued on the assumption that each step of the methods is performed by the control system for cruise control 200 illustrated in FIG. 1. However, for convenience of description, the description of the subject of operation of each step included in the methods may be omitted.

FIG. 2 is a flowchart illustrating a control method for a cruise control function according to driver carelessness, which may be performed by the control system for cruise control according to some embodiments of the present disclosure.

In step S100, the control system for cruise control 200 may determine a driving mode of the driving vehicle 100. In this case, the mode of the driving vehicle 100 may be at least one of a general driving mode in which a driver controls the driving vehicle, an autonomous driving mode in which the driving vehicle 100 autonomously drives without the driver's control, and a remote driving mode in which the driving vehicle 100 is remotely controlled through a remote control system.

The control system for cruise control 200 may determine which driving mode the driving vehicle 100 is currently driving in and may control the cruise control function accordingly.

In one embodiment, the control system for cruise control 200 controls the cruise control function when the driving vehicle 100 is in the autonomous driving mode in which the driving vehicle 100 autonomously drives without the driver's control.

In addition, the autonomous driving mode of the present disclosure means a state in which the driving vehicle 100 autonomously drives within a range that can be understood by a person skilled in the art and may include all steps from the first to the fourth steps of autonomous driving. The contents of the first to fourth steps of autonomous driving are within the range that the person skilled in the art can understand.

In step S200, the control system for cruise control 200 may determine a headway level when the driving vehicle 100 is in the smart cruise control mode.

When the driving vehicle 100 is autonomously driving, the control system for cruise control 200 can prevent accidents that may occur when the driver does not participate in steering of the driving vehicle 100.

Accordingly, the control system for cruise control 200 may determine whether a driver is in the driving vehicle 100 and is paying attention to the driving. In this case, the driver's attention or carelessness is determined based on the driver's head posture and position information. More specifically, the driver's head posture may be determined by dividing the driver's head posture into one or more levels according to the headway level. For example, headway level 1 may indicate a case where the time period for which the driver's head deviates from a certain position by a preset amount corresponds to a first time period set in advance, and headway level 2 may indicate a case where the time period for which the driver's head deviates from the certain position by the preset amount corresponds to a second time period set in advance. In this case, the second time period may be longer than the first time period. Therefore, the higher the headway level, the longer the time period for which the driver's head deviates from the certain position by the preset amount may be.

In step S300, the control system for cruise control 200 may determine whether the vehicle driver is careless.

The control system for cruise control 200 may determine that the driver's carelessness is higher as the headway level increases. Accordingly, the control system for cruise control 200 may determine the degree of the driver's carelessness depending on the headway level, and may determine whether the driver is careless about the driving of the vehicle 100 based on the headway level. Therefore, the control system for cruise control 200 may determine the driver's carelessness as a first degree in the headway level 1, determine the driver's carelessness as a second degree in the headway level 2, and determine that the degree of driver carelessness is higher in the second degree than in the first degree.

In this case, the above-described headway level 1, headway level 2, first degree, and second degree are examples, and the headway levels and degrees are not limited to two levels and two degrees. Therefore, as a matter of course, the level may be further subdivided into first, second, and third levels, and the degree may be further subdivided into first, second, and third degrees.

Furthermore, a step of determining whether the driver is careless by the control system for cruise control 200 will be described in detail with reference to FIG. 3.

Figure 3:
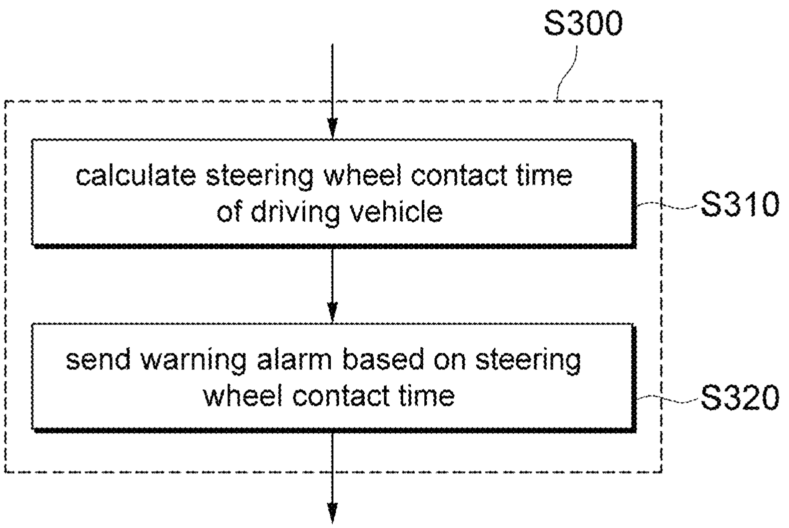
FIG. 3 is a flowchart for explaining in detail a step of determining whether a driver is careless according to embodiments of the present disclosure.

FIG. 3 is a flowchart for explaining in detail the step of determining whether a driver is careless according to the present disclosure.

In step S310, the control system for cruise control 200 may calculate a steering wheel contact time of the driving vehicle 100. The control system for cruise control 200 may calculate the steering wheel contact time and determine the degree of the driver's carelessness as described above. For example, when the steering wheel contact time is the first time, the driver's carelessness degree may be determined as a first degree, and when the steering wheel contact time is the second time, the driver's carelessness degree may be determined as a second degree. In this case, the first time may be longer than the second time, and the second degree may be a case in which the degree of the driver's carelessness is higher than the first degree.

In addition, the degree of the driver's carelessness may be determined through the above two parameters, the headway level and the steering wheel contact time. For example, in the headway level 1, if the steering wheel contact time is the first time, the driver's carelessness may be the first degree, and if the steering wheel contact time is the second time, the driver's carelessness may be the second degree.

In step S320, the control system for cruise control 200 may send a warning alarm based on the steering wheel contact time.

The control system for cruise control 200 may provide a warning alarm through the driving vehicle 100 as the steering wheel contact time decreases. Through this, it is possible to prevent an accident of the driving vehicle 100 by providing a warning alarm to the driver about the driver's carelessness.

In addition, the control system for cruise control 200 may provide different warning alarms depending on the steering wheel contact time. For example, the control system for cruise control 200 may provide the warning alarm at a first volume or for a first duration when the steering wheel contact time is a first time, and may provide the warning alarm at a second volume or for a second duration when the steering wheel contact time is a second time. In this case, the first time may be longer than the second time, the second volume may be greater than the first volume, and the second duration may be longer than the first duration.

Referring back to FIG. 2, in step S400, the control system for cruise control 200 may adjust a distance between the driving vehicle 100 and another vehicle.

The control system for cruise control 200 can prevent a collision of the driving vehicle 100 by controlling the distance between the driving vehicle 100 and another vehicle according to the degree of the driver's carelessness. More specifically, details of how the control system for cruise control 200 adjusts the vehicle-to-vehicle distance will be described in detail with reference to FIG. 4.

Figure 4:
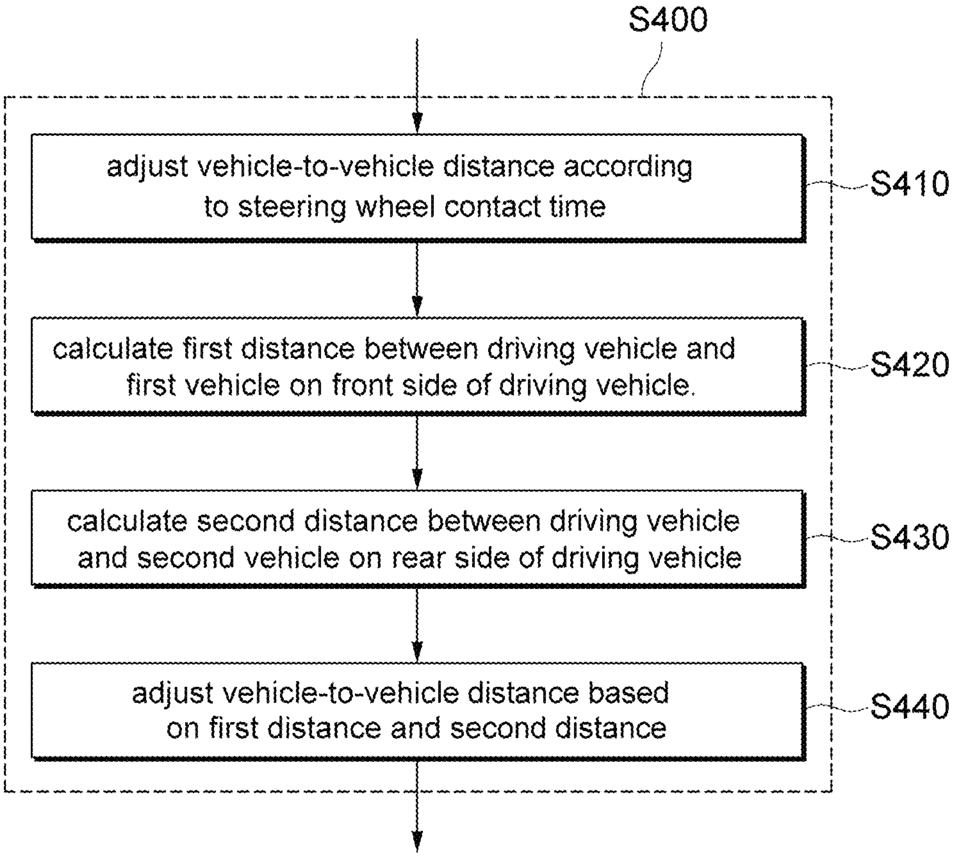
FIG. 4 is a flowchart for explaining in detail a step of adjusting a distance of a driving vehicle and another vehicle according to embodiments of the present disclosure.

FIG. 4 is a flowchart for explaining in detail a step of adjusting a vehicle-to-vehicle distance of a driving vehicle according to the present disclosure.

In step S410, the control system for cruise control 200 may adjust the vehicle-to-vehicle distance according to the steering wheel contact time. The control system for cruise control 200 may adjust the vehicle-to-vehicle distance according to the degree of the driver's carelessness described above. Accordingly, it is possible to prevent collision of the driving vehicle 100 by adjusting the vehicle-to-vehicle distance wider as the degree of the driver's carelessness increases.

In addition, the control system for cruise control 200 may adjust the vehicle-to-vehicle distance based on the steering wheel contact time. Accordingly, as the steering wheel contact time becomes shorter, the vehicle-to-vehicle distance can be controlled to be wider, thereby preventing vehicle collisions.

Specifically, in step S420, the control system for cruise control 200 may calculate a first distance between the driving vehicle and a first vehicle on the front side of the driving vehicle in a driving direction.

The control system for cruise control 200 may calculate a distance between the driving vehicle 100 and the first vehicle on the front side of the driving vehicle 100 as the first distance, and control the distance between the driving vehicle 100 and the first vehicle based on the first distance. Accordingly, when the degree of driver's carelessness is high, the distance to the first vehicle may be controlled to be wider, and when the degree of driver's carelessness is low, the distance to the first vehicle may be controlled to be shorter.

Further, in step S430, the control system for cruise control 200 may calculate a second distance between the driving vehicle and a second vehicle on the rear side of the driving vehicle in the driving direction. The control system for cruise control 200 may calculate and control a distance between the driving vehicle and the second vehicle traveling on the rear side in the driving direction. For example, according to the degree of driver's carelessness, the control system for cruise control 200 may control the second distance to the second vehicle to be wider when the degree of driver's carelessness is high, and may control the second distance to the second vehicle to be narrower when the degree of driver's carelessness is low.

In step S440, the control system for cruise control 200 may adjust the vehicle-to-vehicle distance based on the first distance and the second distance. The control system for cruise control 200 can prevent a vehicle collision by adjusting the first distance and the second distance, and the first distance and the second distance may be controlled depending on whether the driver is careless or not. For example, when the driver's carelessness is a first degree, the driving vehicle 100 may be controlled in a manner in which the second distance is shorter than the first distance, and when the driver's carelessness is a second degree, the driving vehicle 100 may be controlled by controlling the second distance to be longer than the first distance. In this case, the second degree may be a case where the driver's carelessness degree is higher than the first degree.

Hereinafter, referring to FIGS. 5 and 6, it will be described in detail through specific exemplary drawings.

Figure 5:
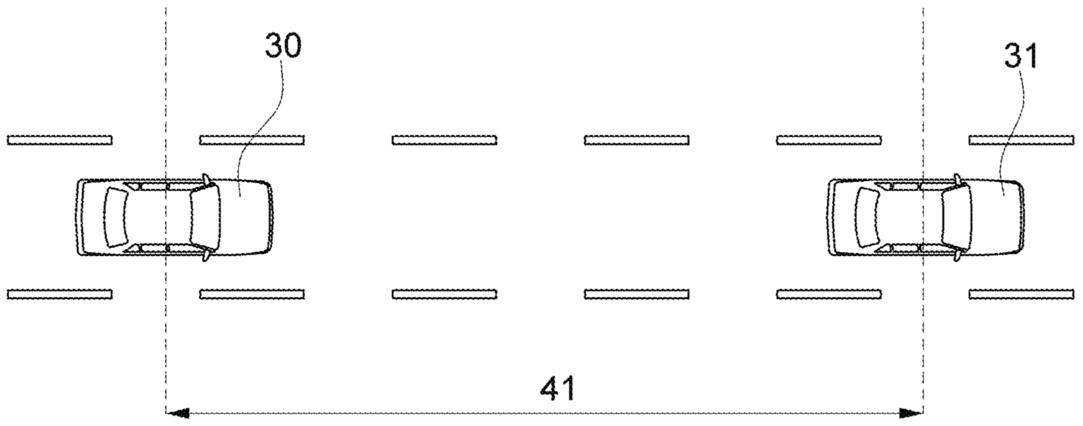
FIGS. 5 and 6 are diagrams illustrating control of a vehicle according to whether a driver is careless according to embodiments of the present disclosure.
Figure 6:
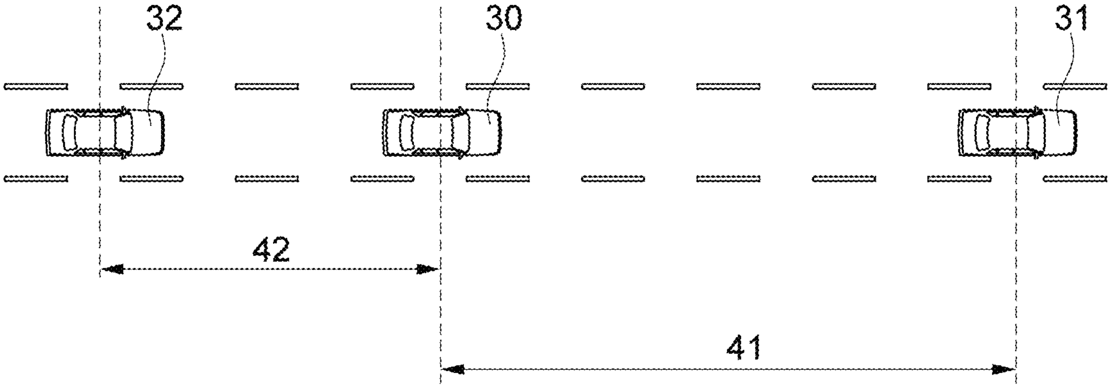

FIGS. 5 and 6 are exemplary diagrams related to control of a driving vehicle according to whether a driver is careless or not according to the present disclosure.

Referring to FIGS. 5 and 6, while a driving vehicle 30 is driving, a first vehicle 31 traveling on the front side of the driving vehicle 30 may be located. In this case, a first distance 41 between the driving vehicle 30 and the first vehicle 31 can be controlled according to the contents described above with reference to FIGS. 2 to 4. For example, when the driver's carelessness is the second degree rather than the first degree, the first distance 41 can be controlled to be wider. In this case, the second degree may be a case where the driver's carelessness is higher than the first degree.

Further, while the driving vehicle 30 is driving, a second vehicle 32 traveling on the rear side of the driving vehicle 30 may be located. In this case, a second distance 42 between the driving vehicle 30 and the second vehicle 32 can be controlled according to the contents described above with reference to FIGS. 2 to 4 for the second distance 42. For example, when the driver's carelessness is the second degree rather than the first degree, the second distance 42 can be controlled to be wider.

In addition, the first distance 41 and the second distance 42 may be simultaneously controlled according to the degree of the driver's carelessness.

Hereinafter, a system to which the embodiment of the present disclosure may be applied will be described with reference to FIG. 7.

Figure 7:
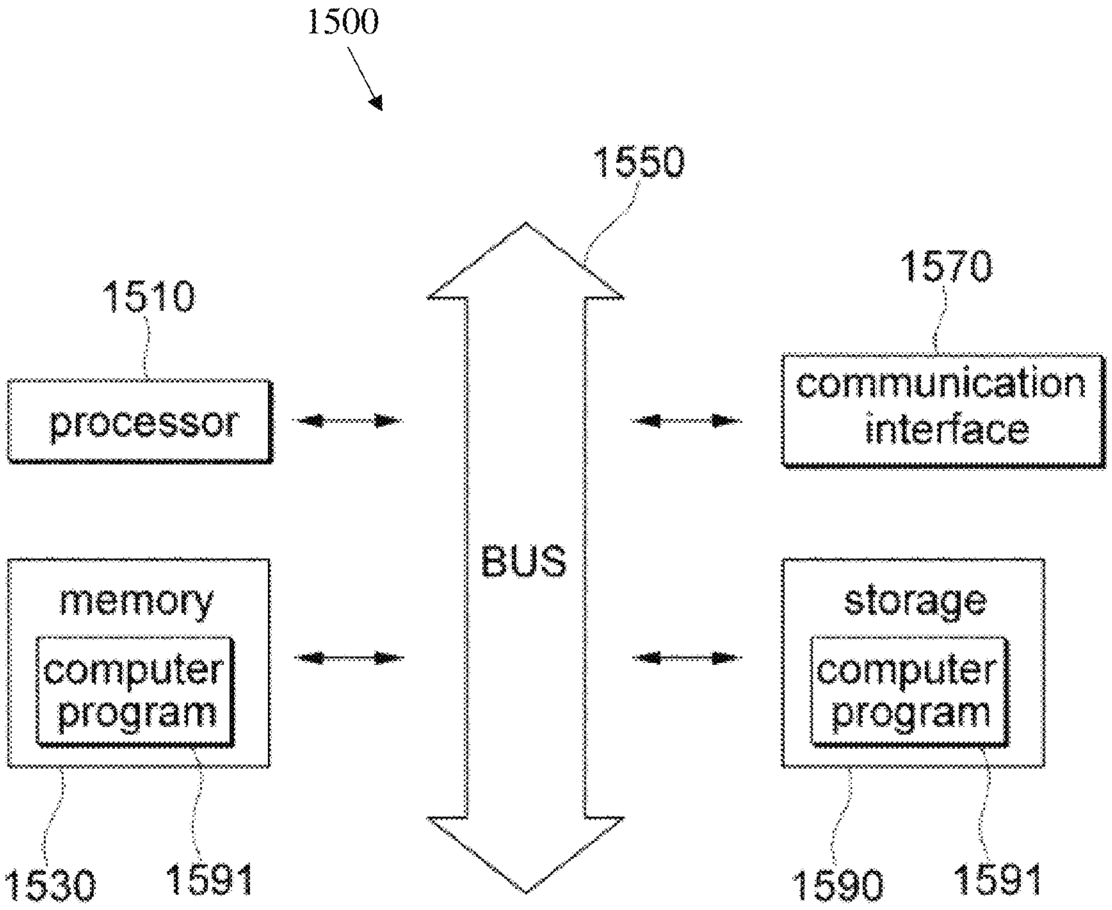
FIG. 7 is a diagram of a computing device in which devices and/or systems in accordance with various embodiments of the present disclosure may be implemented.

FIG. 7 is a diagram of an exemplary computing device in which devices and/or systems in accordance with various embodiments of the present disclosure may be implemented.

A computing device 1500 may include one or more processors 1510, a bus 1550, a communication interface 1570, a memory 1530 that loads a computer program 1591 executed by the processor 1510, and a storage 1590 storing the computer program 1591. However, only components related to the embodiment of the present disclosure are shown in FIG. 7. Accordingly, those of ordinary skill in the art to which the present disclosure pertains may know that other general-purpose components may be further included in addition to the components shown in FIG. 7.

The processor 1510 controls the overall operation of each component of the computing device 1500. The processor 1510 may include a central processing unit (CPU), a micro processor unit (MPU), a micro controller unit (MCU), a graphics processing unit (GPU), or any type of processor well known in the art of the present disclosure. Further, the processor 1510 may perform an operation for at least one application or program for executing the method according to the embodiments of the present disclosure. The computing device 1500 may include one or more processors.

The memory 1530 stores various data, instructions and/or information. The memory 1530 may load one or more programs 1591 from the storage 1590 to execute the method according to the embodiments of the present disclosure. The memory 1530 may be implemented as a volatile memory such as RAM, but the technical scope of the present disclosure is not limited thereto.

The bus 1550 provides a communication function between the components of the computing device 1500. The bus 1550 may be implemented as various types of buses such as an address bus, a data bus, and a control bus.

The communication interface 1570 supports wired and wireless Internet communication of the computing device 1500. Further, the communication interface 1570 may support various communication methods other than Internet communication. To this end, the communication interface 1570 may include a communication module well known in the art of the present disclosure.

According to some embodiments, the communication interface 1570 may be omitted.

The storage 1590 may non-temporarily store the one or more programs 1591 and various data.

The storage 1590 may include a non-volatile memory such as read only memory (ROM), erasable programmable ROM (EPROM), electrically erasable programmable ROM (EEPROM), flash memory, etc., a hard disk, an attachment/detachment disk, or any computer-readable recording medium well known in the art of the present disclosure.

The computer program 1591 may include one or more instructions that, when loaded into the memory 1530, cause the processor 1510 to perform the methods/operations in accordance with various embodiments of the present disclosure. That is, the processor 1510 may perform the methods/operations according to various embodiments of the present disclosure by executing the one or more instructions.

So far, various embodiments of the present disclosure and effects according to the embodiments have been described with reference to FIGS. 1 to 7. The effects according to the technical idea of the present disclosure are not limited to the effects mentioned above, and other effects not mentioned would be clearly understood by those skilled in the art from the description of the present specification.

The technical idea of the present disclosure described with reference to FIGS. 1 to 7 so far may be implemented as computer-readable codes on a computer-readable medium. The computer-readable recording medium may be, for example, a portable recording medium (CD, DVD, Blu-ray disc, USB storage device, portable hard disk) or a fixed recording medium (ROM, RAM, computer-equipped hard disk). The computer program recorded on the computer-readable recording medium may be transmitted to another computing device through a network such as the Internet to be installed and used in another computing device.

In the above, even though all components constituting the embodiments of the present disclosure have been described as being combined or operated in the combined state, the technical idea of the present disclosure is not necessarily limited to these embodiments. That is, within the scope of the present disclosure, one or more of the components may be selectively combined to operate.

Although the drawings show operations described in a specific order, it should not be understood that the operations are to be performed in the shown specific order or sequential order, or that all shown operations should be performed to obtain a desired result. In certain circumstances, multitasking and parallel processing may be advantageous. Moreover, the separation of the various components in the embodiments described above should not be understood as requiring such separation, and it should be understood that the described program components and systems may generally be integrated together into a single software product or packaged into multiple software products.

Although the embodiments of the present disclosure have been described with reference to the accompanying drawings, those skilled in the art to which the present disclosure pertains may understand that the present disclosure may be implemented in other specific forms without changing the technical idea or essential features of the present disclosure. Therefore, the embodiments described above should be understood as illustrative in all respects and not limiting. The protection scope of the present disclosure should be construed by the following claims, and all technical ideas within the equivalent scope should be construed as being included in the scope of the technical ideas defined by the present disclosure.

What is claimed is:

1. A method performed by a control system for cruise control, the method comprising:

determining a driving mode of a driving vehicle;

in response to determining the driving mode of the driving vehicle being a smart cruise control mode, determining a headway level of a driver, the headway level including a first headway level corresponding to a first time period during which a driver's head is out of a predetermined position, and a second headway level corresponding to a second time period during which the driver's head is out of the predetermined position, wherein the second time period is longer than the first time period;

determining whether a driver of the driving vehicle is careless, wherein the determining whether the driver of the driving vehicle is careless includes calculating a steering wheel contact time of the driving vehicle, the steering wheel contact time includes a first steering wheel contact time and a second steering wheel contact time, the second steering wheel contact time is shorter than the first steering wheel contact time; and controlling the driving vehicle to adjust a distance between the driving vehicle and another vehicle based on a degree of driver's carelessness, wherein the degree of the driver's carelessness is determined according to the determined headway level and the calculated steering wheel contact time, wherein upon determining that the headway level is the first headway level, the degree of the driver's carelessness is determined to be a first degree in response to the steering wheel contact time being the first steering wheel contact time, and the degree of the driver's carelessness is determined to be a second degree in response to the steering wheel contact time being the second steering wheel contact time.

2. The method of claim 1, wherein the determining whether the driver of the driving vehicle is careless further includes sending a warning alarm based on the steering wheel contact time.

3. The method of claim 1, wherein the controlling the driving vehicle to adjust the distance between the driving vehicle and another vehicle further includes calculating a first distance between the driving vehicle and a first vehicle on a front side of the driving vehicle.

4. The method of claim 3, wherein the controlling the driving vehicle to adjust the distance between the driving vehicle and another vehicle further includes calculating a second distance between the driving vehicle and a second vehicle on a rear side of the driving vehicle.

5. The method of claim 4, wherein the controlling the driving vehicle to adjust the distance between the driving vehicle and another vehicle further includes adjusting the distance between the driving vehicle and another vehicle based on the first distance and the second distance.

6. The method of claim 5, wherein in response to the degree of the driver's carelessness being the first degree, adjusting the distance between the driving vehicle and another vehicle to cause the second distance to be shorter than the first distance, and in response to the degree of the driver's carelessness being the second degree, adjusting the distance between the driving vehicle and another vehicle to cause the second distance to be longer than the first distance.

7. The method of claim 6, wherein the determining whether the driver of the driving vehicle is careless further includes sending a first warning alarm at a first volume in response to the steering wheel contact time being the first steering wheel contact time, and sending a second warning alarm at a second volume in response to the steering wheel contact time being the second steering wheel contact time, the second volume being greater than the first volume.

8. A control system for cruise control, the system comprising:

a processor;

a communication interface;

a memory; and a computer program loaded into the memory and executed by the processor, wherein the processor is configured to perform processes of:

determining a driving mode of a driving vehicle;

in response to determining the driving mode of the driving vehicle being a smart cruise control mode, determining a headway level of a driver, the headway level including a first headway level corresponding to a first time period during which a driver's head is out of a predetermined position, and a second headway level corresponding to a second time period during which the driver's head is out of the predetermined position, wherein the second time period is longer than the first time period;

determining whether a driver of the driving vehicle is careless, wherein the process of determining whether the driver of the driving vehicle is careless includes a process of calculating a steering wheel contact time of the driving vehicle, the steering wheel contact time includes a first steering wheel contact time and a second steering wheel contact time, the second steering wheel contact time is shorter than the first steering wheel contact time; and controlling the driving vehicle to adjust a distance between the driving vehicle and another vehicle based on a degree of driver's carelessness, wherein the degree of the driver's carelessness is determined according to the determined headway level and the calculated steering wheel contact time, wherein upon determining that the headway level is the first headway level, the degree of the driver's carelessness is determined to be a first degree in response to the steering wheel contact time being the first steering wheel contact time, and the degree of the driver's carelessness is determined to be a second degree in response to the steering wheel contact time being the second steering wheel contact time.

9. The control system of claim 8, wherein the process of determining whether the driver of the driving vehicle is careless further includes a process of sending a warning alarm based on the steering wheel contact time.

10. The control system of claim 8, wherein the process of controlling the driving vehicle to adjust the distance between the driving vehicle and another vehicle further includes a process of calculating a first distance between the driving vehicle and a first vehicle on a front side of the driving vehicle.

11. The control system of claim 10, wherein the process of controlling the driving vehicle to adjust the distance between the driving vehicle and another vehicle further includes a process of calculating a second distance between the driving vehicle and a second vehicle on a rear side of the driving vehicle.

12. The control system of claim 11, wherein the process of controlling the driving vehicle to adjust the distance between the driving vehicle and another vehicle further includes a process of adjusting the distance between the driving vehicle and another vehicle based on the first distance and the second distance.

13. The control system of claim 12, wherein in response to the degree of the driver's carelessness being the first degree, the processor is configured to perform the process of adjusting the distance between the driving vehicle and another vehicle to cause the second distance to be shorter than the first distance, and in response to the degree of the driver's carelessness being the second degree, the processor is configured to perform the process of adjusting the distance between the driving vehicle and another vehicle to cause the second distance to be longer than the first distance.

14. The control system of claim 13, wherein the process of determining whether the driver of the driving vehicle is careless further includes a process of sending a first warning alarm at a first volume in response to the steering wheel contact time being the first steering wheel contact time, and a process of sending a second warning alarm at a second volume in response to the steering wheel contact time being the second steering wheel contact time, the second volume being greater than the first volume.

* * * * *